US011564037B2

(12) United States Patent
Han et al.

(10) Patent No.: US 11,564,037 B2
(45) Date of Patent: Jan. 24, 2023

(54) DISPLAY DEVICE, SOUNDING CONTROL METHOD AND SOUNDING CONTROL DEVICE

(71) Applicant: BOE TECHNOLOGY GROUP CO., LTD., Beijing (CN)

(72) Inventors: Yanling Han, Beijing (CN); Yingming Liu, Beijing (CN); Yaqian Ji, Beijing (CN); Xiufeng Li, Beijing (CN); Wenchao Han, Beijing (CN); Lianghao Zhang, Beijing (CN); Peixiao Li, Beijing (CN); Yuzhen Guo, Beijing (CN); Yue Gou, Beijing (CN); Chenyang Zhang, Beijing (CN); Xiaoliang Ding, Beijing (CN); Jing Yu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/241,797

(22) Filed: Apr. 27, 2021

(65) Prior Publication Data

US 2022/0103940 A1 Mar. 31, 2022

(30) Foreign Application Priority Data

Sep. 30, 2020 (CN) .......................... 202011058449.5

(51) Int. Cl.
*H04R 3/12* (2006.01)
*G06F 3/147* (2006.01)
(Continued)

(52) U.S. Cl.
CPC .............. *H04R 3/12* (2013.01); *G06F 3/147* (2013.01); *G06F 3/162* (2013.01); *G10L 25/57* (2013.01);
(Continued)

(58) Field of Classification Search
CPC ........ H04R 1/403; H04R 1/345; H04R 1/028; H04R 3/12; H04R 2499/15
(Continued)

(56) References Cited

U.S. PATENT DOCUMENTS 10,219,075 B2 * 2/2019 Rakshit .................. H04R 1/028
11,030,940 B2 * 6/2021 Watson .................. H04R 1/028
(Continued)

FOREIGN PATENT DOCUMENTS

CN 102006541 A 4/2011
CN 102450000 A 5/2012
(Continued)

OTHER PUBLICATIONS

First Office Action for Chinese Application No. 202011058449.5, dated Jun. 17, 2021, 11 Pages.
(Continued)

*Primary Examiner* — Disler Paul
(74) *Attorney, Agent, or Firm* — Brooks Kushman P.C.

(57) ABSTRACT

The present application provides a display device, a sounding control method and a sounding control device. The display device includes: a display panel including a plurality of display pixel groups, wherein each display pixel group includes at least one pixel unit; a plurality of sounding units arranged in an array at one side of the display panel away from a display screen; and sound transmission channels in spacing regions between adjacent ones of the display pixel groups. Sound produced by the sounding units is output from the display panel through the sound transmission channels, and sound produced by different ones of the sounding units is output through different ones of the sound transmission channels.

20 Claims, 4 Drawing Sheets

(51) Int. Cl.
  *G06F 3/16*   (2006.01)
  *G10L 25/57*  (2013.01)
  *H04R 1/02*   (2006.01)
  *H04R 1/34*   (2006.01)
  *H04R 1/40*   (2006.01)

(52) U.S. Cl.
  CPC ............ *H04R 1/028* (2013.01); *H04R 1/345* (2013.01); *H04R 1/403* (2013.01); *H04R 2400/11* (2013.01); *H04R 2499/15* (2013.01)

(58) Field of Classification Search
  USPC ........................................ 381/333, 306, 388
  See application file for complete search history.

(56) References Cited

U.S. PATENT DOCUMENTS

| | | | | |
|---|---|---|---|---|
| 11,138,915 | B2* | 10/2021 | Rohena | ............... F04D 25/08 |
| 11,146,873 | B2* | 10/2021 | Heo | ............... H01L 51/0097 |
| 11,375,305 | B2* | 6/2022 | Hockman | ............... G06F 3/147 |
| 2012/0082332 | A1 | 4/2012 | Park | |
| 2012/0327252 | A1 | 12/2012 | Nichols et al. | |
| 2019/0182926 | A1* | 6/2019 | Engelen | ............... H05B 47/10 |
| 2019/0308114 | A1 | 10/2019 | Tremblay et al. | |

FOREIGN PATENT DOCUMENTS

| | | |
|---|---|---|
| CN | 109937442 A | 6/2019 |
| CN | 110969953 A | 4/2020 |
| CN | 111641898 A | 9/2020 |
| EP | 3623913 A1 | 3/2020 |
| KR | 20030062742 A | 7/2003 |

OTHER PUBLICATIONS

Xi, Ming, "Research on Reconstruction and Display Technologies of Three-Dimensional Video Based on Auto-Stereoscopic Display," Jun. 9, 2013, Chinese Doctoral Dissertation, Zhejiang University, 154 Pages (including English-language Abstract).

* cited by examiner

DISPLAY DEVICE, SOUNDING CONTROL METHOD AND SOUNDING CONTROL DEVICE

CROSS-REFERENCE TO RELATED APPLICATIONS

This application claims priority to Chinese Patent Office Application No. 202011058449.5, filed on Sep. 30, 2020, which is hereby incorporated by reference in its entirety.

TECHNICAL FIELD

The present application relates to the technical field of displaying technology, in particular to a display device, a sounding control method and a sounding control device.

BACKGROUND

With the development of displaying technology, consumers not only focus on requirements of picture quality and clarity of display devices, but also pay more attention to output effect of sound, and the consumers prefer to the display device which can perfectly integrate the picture display and sound play to realize a sound-picture integration effect.

In the related art, the sound-picture integration of the display device is realized through a screen sounding technology, but an excitation vibrator needs to be attached to a back of a screen by adopting the screen sounding technology, so that the excitation vibrator drives the screen to vibrate, there pushing airflow to produce sound. The screen sounding technology has problems such as immature technology, sound distortion and a risk of damage to a display panel due to long-term vibration.

SUMMARY

Embodiment of the present application provides a display device including:

a display panel including a plurality of display pixel groups, wherein each display pixel group includes at least one pixel unit;

a plurality of sounding units arranged in an array at one side of the display panel away from a display screen; and sound transmission channels in spacing regions between adjacent ones of the display pixel groups;

wherein sound produced by the sounding units is output from the display panel through the sound transmission channels, and sound produced by different ones of the sounding units is output through different ones of the sound transmission channels.

Optionally, the display device further includes a controller; the sounding units are coupled with the controller, and the controller is configured to output different audio signals to different ones of the sounding units.

Optionally, each display pixel group is a display sub-panel; the display panel is composed of a plurality of display sub-panels sequentially spliced; splicing gaps in spacing regions between adjacent ones of the display sub-panels are formed as the sound transmission channels; or, the pixel unit is a light-emitting pixel unit; a region between the light-emitting pixel unit of one of the display pixel groups and the light-emitting pixel unit of another one of the display pixel groups is the spacing region; an opening that extends through opposite surfaces of the display panel, is defined in the spacing region; the opening is formed as the sound transmission channel.

Optionally, a sounding direction of the sounding units is a direction toward the display screen; and the display device further includes: a sound guide element arranged between the display panel and the sounding unit; through the sound guide element, sound generated by the sounding unit is transmitted to the corresponding sound transmission channel.

Optionally, an orthographic projection of the sounding unit onto a plane where the display panel is located, covers the corresponding sound transmission channel.

Optionally, the display device further includes a support plate spaced apart from the display panel; and each of the sounding units is installed on the support plate.

Optionally, the support plate is a circuit board for display control.

Optionally, a sounding direction of the sounding units is a direction away from the display screen; and the display device further includes:

a sound wave reflecting element disposed at one side of the sounding units away from the display panel, and configured to reflect sound produced by the sounding units in a direction toward the display screen; and sound guide elements disposed between the sound wave reflecting element and the display panel and configured to transmit the sound reflected by the sound wave reflecting element to the corresponding sound transmission channels.

Optionally, the display device further includes a circuit board corresponding to each of the display pixel groups; the circuit board is attached to the display panel; and the sounding units are arranged at one side of the circuit board away from the display panel.

Optionally, at least one of the sounding units is arranged on each circuit board.

Optionally, the pixel unit is a light-emitting pixel unit; an opening that extends through opposite surfaces of the display panel, is defined in the spacing region; a sounding direction of the sounding unit is directed to a plurality of openings; and the sound produced by the sounding units are output through the plurality of the openings.

Optionally, the display device further includes a circuit board spaced apart from the display panel; and the sounding units are between the circuit board and the display panel, and are fixed to the circuit board.

Optionally, the display device includes a plurality of display sub-panels arranged in an array, and each of the display sub-panels includes a plurality of display pixel groups.

Optionally, the sound transmission channels used for outputting the sound produced from the sounding units are uniformly distributed at the display panel.

Optionally, the display device further includes a sounding control device; and the sounding control device includes:

a data acquisition module configured to acquire video data and audio data of to-be-output audio and video data;

a detection module configured to detect a sounding position of a sounding object included in a target image frame in the target image frame when the target image frame of the video data is displayed on the display panel, and determine a target sounding unit corresponding to the sounding position from the sounding units;

an extraction module configured to extract a target sounding signal corresponding to the sounding object from audio signals of the audio data corresponding to the target image frame; and a sound output module configured to output the target sounding signal to the target sounding unit.

Optionally, the sounding control device further includes:
a sound channel determination module configured to determine a sounding channel for outputting the audio data corresponding to the target image frame;

the sound output module is further configured to output the audio data to the sounding units corresponding to the sounding channel; wherein the sounding units located in different regions are corresponding to different sounding channels.

One embodiment of the present application further provides a sounding control method applied to the fore going display device, the method includes:

acquiring video data and audio data of to-be-output audio and video data;

detecting a sounding position of a sounding object included in a target image frame in the target image frame when the target image frame of the video data is displayed on the display panel, and determining a target sounding unit corresponding to the sounding position from the sounding units;

extracting a target sounding signal corresponding to the sounding object from audio signals of the audio data corresponding to the target image frame; and outputting the target sounding signal to the target sounding unit.

Optionally, the method further includes:
determining a sounding channel for outputting the audio data corresponding to the target image frame;

outputting the audio data to the sounding units corresponding to the sounding channel; wherein the sounding units located in different regions are corresponding to different sounding channels.

One embodiment of the present application further provides a sounding control device, including:

a data acquisition module configured to acquire video data and audio data of to-be-output audio and video data;

a detection module configured to detect a sounding position of a sounding object included in a target image frame in the target image frame when the target image frame of the video data is displayed on a display panel, and determine a target sounding unit corresponding to the sounding position from sounding units;

an extraction module configured to extract a target sounding signal corresponding to the sounding object from audio signals of the audio data corresponding to the target image frame; and a sound output module configured to output the target sounding signal to the target sounding unit.

Optionally, the sounding control device further includes:
a sound channel determination module configured to determine a sounding channel for outputting the audio data corresponding to the target image frame; the sound output module is further configured to output the audio data to the sounding units corresponding to the sounding channel; wherein the sounding units located in different regions are corresponding to different sounding channels

BRIEF DESCRIPTION OF THE DRAWINGS

The drawings are included to provide a better understanding of the application and are not to be construed as limiting the application. Wherein.

DETAILED DESCRIPTION

Figure 1:
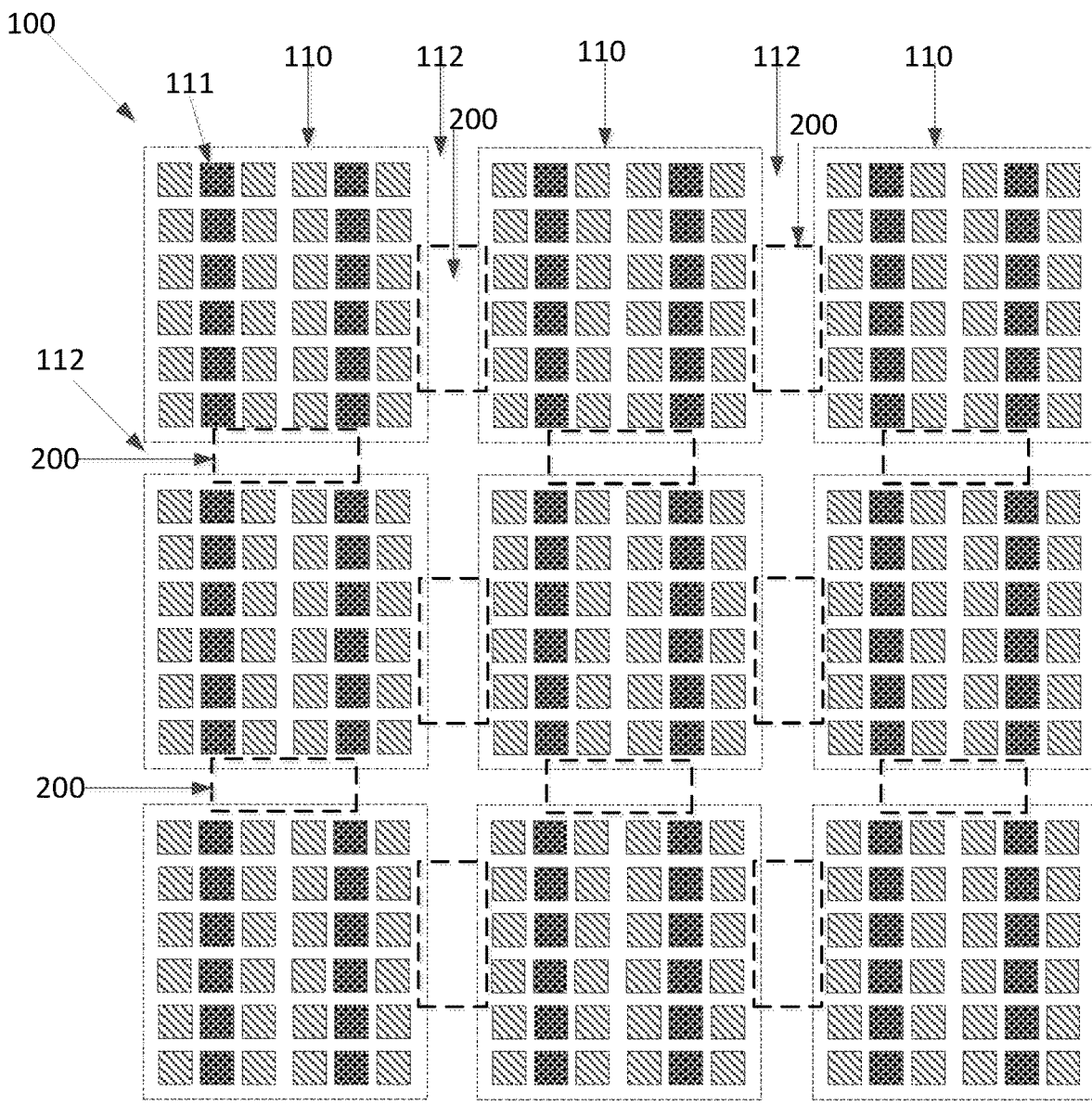
FIG. 1 is a schematic plan view of a first example of a display device according to an embodiment of the present application.

Reference will now be made in detail to the exemplary embodiments of the present application, examples of which are illustrated in the accompanying drawings, wherein the various details of the embodiments of the present application are included to facilitate understanding and are to be considered as exemplary only. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

Embodiments of the present application provides a display device, a sounding control method and a sounding control device, which can achieve a screen sounding effect on the premise of not damaging a display panel and ensuring better sound quality.

In order to achieve the screen sounding effect for the display device, while ensuring better sound quality without a risk of damage to a display panel due to long-term vibration, one embodiment of the present application provides a display device, in which a plurality of sounding units are arranged at one side of a display panel away from a display screen, and the sounding units output sound through spacing regions among a plurality of display pixel groups of the display panel to present the screen sounding effect. Compared with conventional technique of using an exciter to drive the screen to vibrate and sound, with implementation structures of the present application, there is no need to vibrate the screen to produce sound, a sounding method that is easy to implement and convenient to control is adopted, thereby realizing the screen sounding effect while ensuring better sound quality without damage to the display panel.

A display device provided in one embodiment of the present application includes:

a display panel including a plurality of display pixel groups, where each display pixel group includes at least one pixel unit;

a plurality of sounding units arranged in an array at one side of the display panel away from a display screen; and sound transmission channels in spacing regions between adjacent display pixel groups, where sound produced by the sounding units can be output from the display panel through the sound transmission channels, and sound produced by different sounding units is output through different sound transmission channels. In the embodiment of the present application, the display panel may be any one of a liquid crystal display (LCD), an organic light emitting display (OLED), a mini light emitting diode (LED), and the like, but is not limited to only those types of display panels.

Specifically, the sound transmission channels are arranged in the spacing regions between the adjacent display pixel groups and are configured to transmit the sound produced by the sounding units to an outside of the display panel, thereby presenting a screen sounding effect.

By employing the display device of the embodiments of the present application, a plurality of sounding units is arranged in an array at one side of the display panel away from the display screen, and sound transmission channels corresponding to the sounding units are defined in the spacing regions between adjacent display pixel groups of the display panel. Optionally, different sounding units output sound through the spacing regions between the display pixel groups in different regions, thereby providing a screen sound effect with sound producing positions located at different positions of the display panel. The sounding manner adopted by the display device provided in the embodiment of the present application does not require screen vibration to produce sound, and the sounding units may employ common sounding components such as a loudspeaker, an ultrasonic sounding device, and thus, the sounding manner adopted by the display device provided in the embodiment of the present application is easy to implement, and can conveniently control sounding volume and sound quality, thereby providing better sounding effect.

In one embodiment of the present application, optionally, the sound transmission channels used for outputting the sound produced by the sounding units are uniformly distributed at the display panel, thereby ensuring uniform sounding effect at each region of the entire display panel.

It should be noted that the sound transmission channels used for outputting the sound produced by the sounding units are not limited to being uniformly distributed at the entire display panel. For example, a distribution density of the sound transmission channels which are distributed at left and right sides of the display panel for outputting the sound produced by the sound units, may be greater than a distribution density of the sound transmission channels which are distributed in a middle region of the display panel for outputting the sound produced by the sound units, thereby achieving a stereo effect during sound playing.

According to one embodiment of the present application, optionally, the display pixel groups may be display sub-panels in the display panel. One display sub-panel is formed into an independent display unit. Multiple display sub-panels are sequentially spliced together with a region corresponding to a splicing position between adjacent display sub-panels forming as a spacing region. A splicing gap in the spacing region is formed as the sound transmission channel, so that sound produced by the sounding units can be output from the display panel.

In another embodiment, the display pixel group may include multiple light-emitting pixel units, such as OLED pixel units or LED pixel units. A region between the light-emitting pixel units of one display pixel group and the light-emitting pixel units of another display pixel group is formed as a spacing region. An opening is defined in the spacing region and extends through opposite surfaces of the display panel. The opening is formed as the sound transmission channel. Specifically, through the opening defined through the opposite surfaces of the display panel in the spacing region, sound produced by the sounding unit can be output from the display panel.

With this embodiment, multiple openings may be uniformly distributed in the display panel. Each opening is located at an edge of one display pixel group. Multiple openings may be distributed at the edge of one display pixel group. One display pixel group may include multiple light-emitting pixel units arranged in an array. With this embodiment, the light-emitting pixel units in the display panel may be divided into multiple display pixel groups, and each display pixel group has a preset shape. The openings used for outputting sound are distributed at edges of the multiple display pixel groups.

In one embodiment of the present application, optionally, the display device further includes a controller. The multiple sounding units are coupled with the controller, and the controller can output different audio signals to different sounding units.

In one embodiment, optionally, different sounding units are coupled with the controller through different connecting circuits, respectively. The controller can output different audio signals to different sounding units through different connecting circuits, thereby realizing independent control of the multiple sounding units.

In another embodiment, optionally, sounding units located in different regions are coupled with the controller through different connecting circuits, respectively. The controller can output different audio signals to the sounding units located in different regions through the different connecting circuits, thereby realizing control of the sounding units according to regions where the sounding units are located.

Specific structures of the display device according to the embodiments of the present application are described hereinafter with reference to the accompanying drawings.

Figure 2:
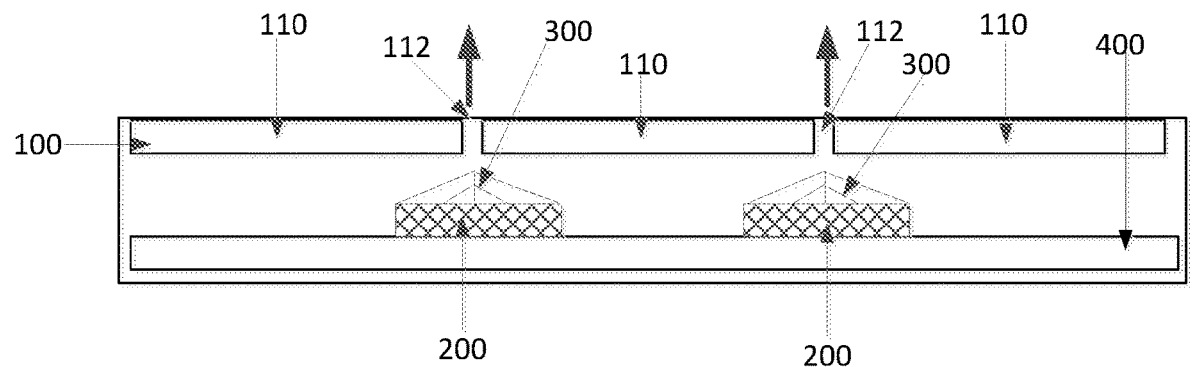
FIG. 2 is a schematic sectional view of the first example of the display device according to an embodiment of the present application.

FIG. 1 is a schematic plan view of a first example of a display device according to an embodiment of the present application. FIG. 2 is a schematic sectional view of the display device according to the first example.

In the first example, the display device includes:

a display panel 100 including multiple display pixel groups 110, where each display pixel group 110 includes at least one pixel unit 111; and multiple sounding units 200 arranged in an array at one side of the display panel 100 away from a display screen.

In this example, the display panel may be any one of an LCD panel, an OLED panel, and a mini LED panel.

Optionally, one display pixel group 110 is formed as an independently packaged display sub-panel. A splicing gap in a splicing position between adjacent display sub-panels is formed as a sound transmission channel 112 used for outputting sound produced by the sounding unit 200. In the example, the display panel 100 is a splicing panel of multiple display sub-panels.

In this example, optionally, as shown in FIG. 2, a sounding direction of the sounding unit 200 is a direction toward the display screen of the display panel 100.

The display device further includes sound transmission structures. Each sounding unit 200 is connected with at least one sound transmission structure. Through the sound transmission structure, sound produced by the sounding unit 200 is output from the display panel 100 via the sound transmission channel 112 between adjacent display pixel groups 110.

Optionally, in the example, the sound transmission structure includes a sound guide element 300 arranged between the display panel 100 and the sounding unit 200. Through the sound guide element 300, sound generated by the sounding unit 200 is transmitted to the corresponding sound transmission channel 112.

Optionally, the sound guide element 300 may include a sound guide tube, or, may also include a sound guide channel defined in a member between the sounding unit 200 and the display panel 100.

Optionally, the sounding unit 200 may include a loudspeaker or may include an ultrasonic sounder for ensuring directional transmission of sound so as to enable the sound can be accurately transmitted to the corresponding sound transmission channel 112.

In this example, optionally, an orthographic projection of the sounding unit 200 onto a plane where the display panel 100 is located, covers the corresponding sound transmission channel 112, as shown in FIG. 1. That is, specifically, the sounding units 200 are arranged at positions, which are at one side of the display panel 100 away from the display screen and corresponding to positions of the sound transmission channels 112.

Optionally, the sounding units 200 are arranged on the display panel 100 at corresponding positions of the sound transmission channels 112 between every two adjacent display pixel groups 110, thereby ensuring an even distribution of the sounding units 200 relative to the display panel 100.

In the embodiment of the present application, optionally, as shown in FIG. 2, the display device further includes a support plate 400. The support plate 400 is spaced apart from the display panel 100 and disposed at one side of the display panel 100 away from the display screen. Each sounding unit 200 is installed on the support plate 400. Optionally, the support plate 400 is formed as a middle bezel frame of the display device.

Optionally, a circuit board for controlling the sounding units 200 to produce sound is arranged on the support plate 400, or a circuit board used for implementing display control of the display device is reused as the support plate 400.

With the display device of the first example, multiple sounding units are arranged in an array on the support plate (or the circuit board), the sounding direction of the sounding units is toward the display panel, and the produced sound can be output from the display panel through the spacing regions between the adjacent display pixel groups, thereby providing the screen sounding effect.

In the first example, positional relationship between the sounding unit 200 and the sound transmission channel 112 is explained with an example, in which one display pixel group 110 is formed as an independently packaged display sub-panel, and the region corresponding to the splicing position between adjacent display sub-panels is formed as one sound transmission channel for outputting the sound produced by the sounding unit 200. It should be noted that the display panel 100 is not limited to the foregoing structures including multiple independently packaged display sub-panels. For example, the multiple display pixel groups in the display panel 100 each may also be a structure including multiple light-emitting pixel units, a region between the light-emitting pixel units of one display pixel group and the light-emitting pixel units of another display pixel group is formed as the spacing region, and an opening is defined through opposite surfaces of the display panel in the spacing region. On the basis of this arrangement, the sounding units 200 are installed in the manner shown in FIG. 2 such that the sounding direction of the sounding units 200 is directed towards the display panel 100 and the produced sound can pass through the openings between adjacent display pixel groups (in the embodiment shown in FIG. 2, the openings form the sound transmission channels 112) and then is output from the display panel, thereby providing the screen sounding effect. For this implementation structure, it will not be described in detail herein.

Figure 3:
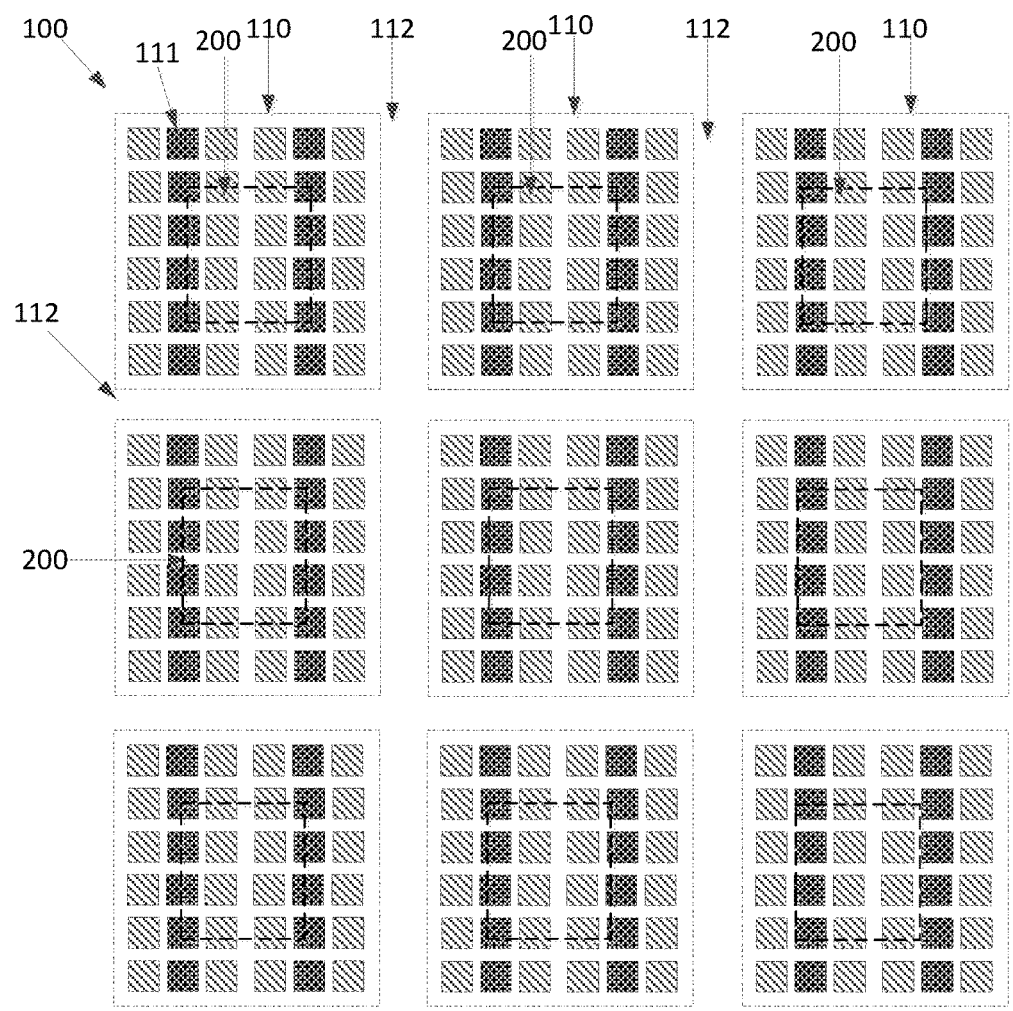
FIG. 3 is a schematic plan view of a second example of a display device according to an embodiment of the present application.
Figure 4:
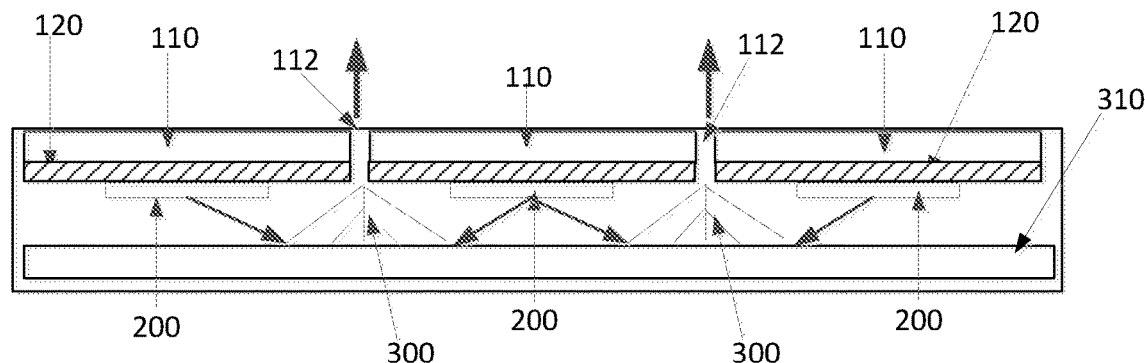
FIG. 4 is a schematic sectional view of the second example of the display device according to an embodiment of the present application.

FIG. 3 is a schematic plan view of a first example of a display device according to an embodiment of the present application. FIG. 4 is a schematic sectional view of the display device of the second example.

In the second example, the display device includes:

a display panel 100 including multiple display pixel groups 110, where each display pixel group 110 includes at least one pixel unit 111; and multiple sounding units 200 arranged in an array at one side of the display panel 100 away from a display screen.

In this example, the display panel may be any one of an LCD panel, an OLED panel, and a mini LED panel.

Optionally, one display pixel group 110 is formed as an independently packaged display sub-panel. A splicing gap in a splicing position between adjacent display sub-panels is formed as a sound transmission channel 112 used for outputting sound produced by the sounding unit 200. In this example, the display panel 100 is a splicing panel of multiple display sub-panels.

In this example, optionally, as shown in FIG. 4, a sounding direction of the sounding unit 200 is a direction away from the display screen of the display panel 100.

The display device further includes sound transmission structures. Each sounding unit 200 is connected with at least one sound transmission structure. Through the sound transmission structure, sound produced by the sounding unit 200 is output from the display panel 100 via the sound transmission channel 112 between adjacent display pixel groups 110.

In this example, the sound transmission structure includes:

a sound wave reflecting element 310 disposed at one side of the sounding units 200 away from the display panel 100, and configured to reflect sound produced by the sounding units 200 in a direction toward the display screen;

sound guide elements 300 disposed between the sound wave reflecting element 310 and the display panel 100 and configured to transmit the sound reflected by the sound wave reflecting element 310 to the corresponding sound transmission channels 112.

Optionally, the sound guide element 300 may include a sound guide tube, or, may also include a sound guide channel defined in a member between the sounding unit 200 and the display panel 100.

Optionally, the sounding unit 200 may include a loudspeaker or may include an ultrasonic sounder for realizing directional transmission of sound.

Optionally, the sound wave reflecting element 310 may include a reflection plate. In this example, optionally, the reflection plate may be arranged on a middle bezel frame of the display panel 100 at one side away from the display screen.

In this example, optionally, the display device further includes a circuit board 120 corresponding to each display pixel group 110. The circuit boards 120 are attached to the display panel 100. The sounding units 200 are arranged at one side of the circuit boards 120 away from the display panel 100. The sound wave reflecting element 310 is located at one side of the sounding units 200 away from the circuit boards 120, and is spaced from the circuit boards 120.

Optionally, the circuit board 120 attached to the display panel 100 are circuit boards for controlling the display panel

100 for displaying. The sounding units 200 are directly fabricated on the circuit boards of the display panel 100, thereby simplifying the structural design and simplifying circuit board production.

In one embodiment of the present application, optionally, one circuit board 120 is corresponding to one display pixel group 110. The number of sounding units 200 on one circuit board 120 may not be limited to only one.

With the display device of the second example, multiple sounding units are arranged in an array on the circuit boards of the display panel, the sounding direction of the sounding units is a direction away from the display screen of the display panel 100. The produced sound is reflected by the sound wave reflecting element 310 and then directionally transmitted by the sound guide elements 300 to the spacing region between the adjacent display pixel groups, and then is output from the display panel, thereby providing screen sounding effect.

In the second example, positional relationship between the sounding unit 200 and the sound transmission channel 112 is explained with an example, in which one display pixel group 110 is formed as an independently packaged display sub-panel, and a splicing gap in the region corresponding to the splicing position between adjacent display sub-panels is formed as one sound transmission channel for outputting the sound produced by the sounding unit 200. It should be noted that the display panel 100 is not limited to the foregoing structures including multiple independently packaged display sub-panels. For example, the multiple display pixel groups in the display panel 100 each may also be a structure including multiple light-emitting pixel units, a region between the light-emitting pixel units of one display pixel group and the light-emitting pixel units of another display pixel group is formed as the spacing region, and an opening is defined through opposite surfaces of the display panel in the spacing region. On the basis of this arrangement, the sounding units 200 are installed in the manner shown in FIG. 4 such that the sounding units 200 are installed on the circuit boards of the display panel 100 and the sounding direction of the sounding units 200 is in a direction away from the display screen of the display panel 100, the produced sound is reflected by the sound wave reflecting element 310 and then directionally transmitted by the sound guide elements 300 to the openings between adjacent display pixel groups 110, and then is output from the display panel, thereby providing screen sounding effect. For this implementation structure, it will not be described in detail herein.

Figure 5:
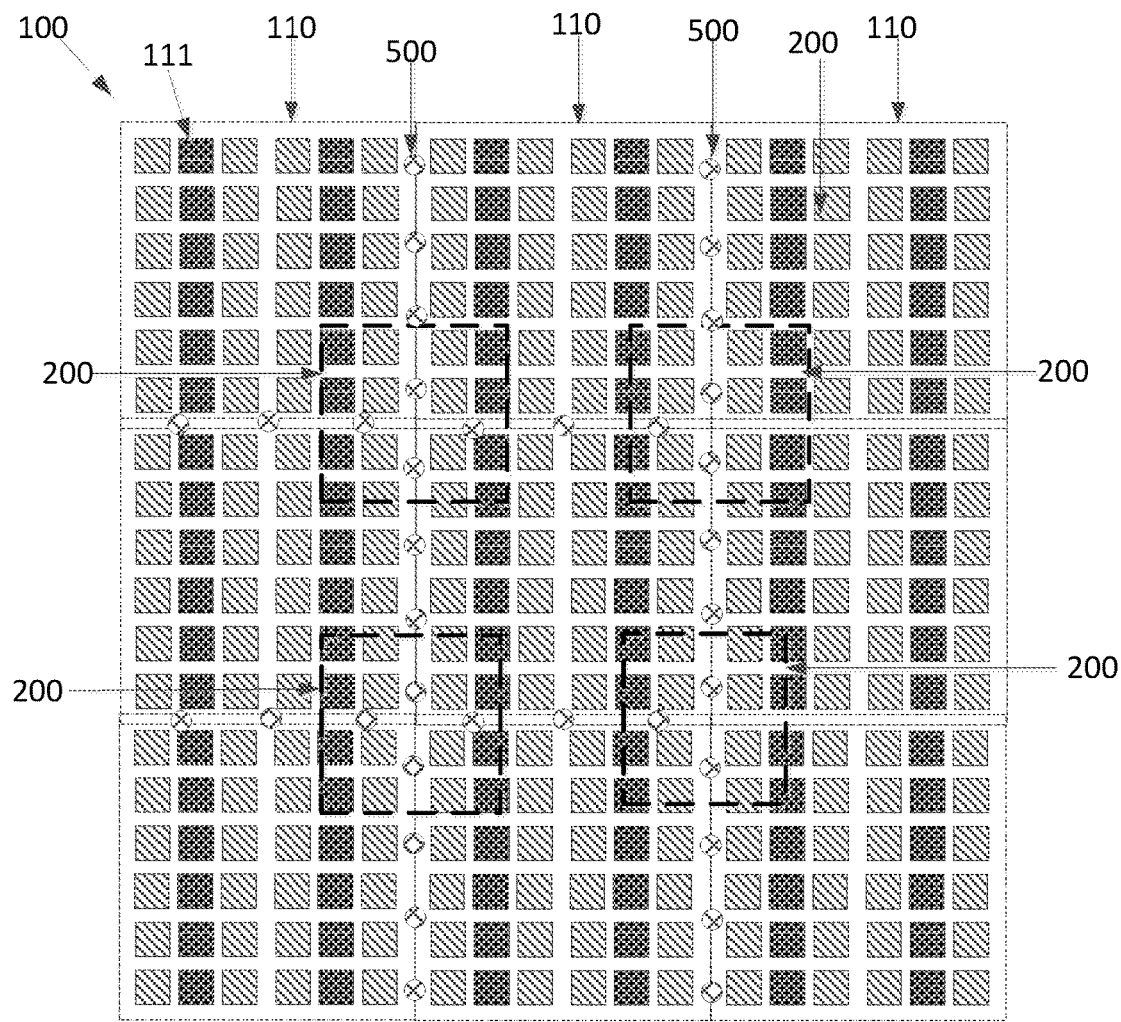
FIG. 5 is a schematic plan view of a third example of a display device according to an embodiment of the present application.
Figure 6:
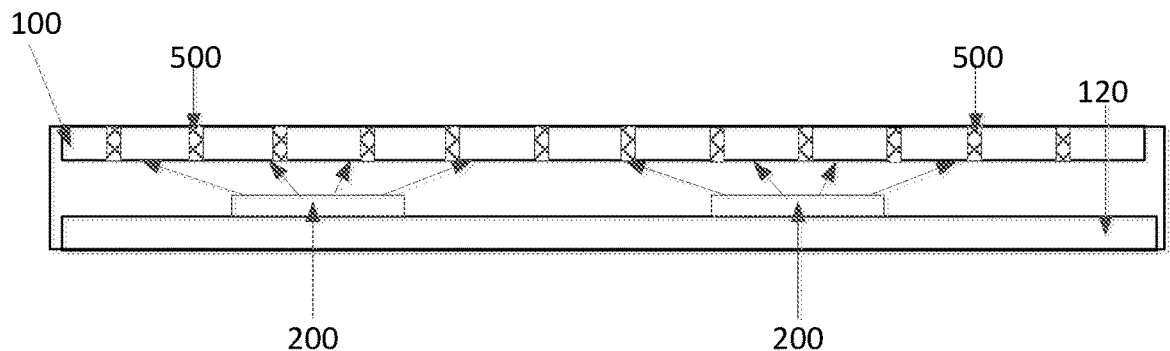
FIG. 6 is a schematic sectional view of the third example of the display device according to an embodiment of the present application.

FIG. 5 is a schematic plan view of a third example of a display device according to an embodiment of the present application. FIG. 6 is a schematic sectional view of the display device of the third example.

In the third example, the display device includes:

a display panel 100 including multiple display pixel groups 110, where each display pixel group 110 includes at least one pixel unit 111; and multiple sounding units 200 arranged in an array at one side of the display panel 100 away from a display screen.

In this example, the display panel may be any one of an LCD panel, an OLED panel, and a mini LED panel.

In the display device of this embodiment, as shown in FIG. 5, the display panel 100 includes multiple display pixel groups 110, and each display pixel group includes multiple pixel units 111. Each display pixel group 110 has a predetermined shape such as a circle or a quadrangle, which is not particularly limited. Openings 500 are defined in edges of the display pixel groups 110, and are in a spacing region between OLED pixel units of one display pixel group 110 and OLED pixel units of another display pixel group 110. The openings 500 extend through opposite surfaces of the display panel 100 to form sound transmission channels for the sounding units 200.

Optionally, as shown in FIG. 6, in this example, the display device further includes a circuit board 120 disposed opposite to the display panel 100. Optionally, the circuit board may be a circuit board used for controlling display of the display panel 100. Optionally, the circuit board may be a circuit board only for controlling the sounding units 200, and optionally, one circuit board may be arranged corresponding to one sounding unit 200.

Specifically, the sounding units 200 are arranged on the circuit board 120, located between the display panel 100 and the circuit boards 120. Sounding direction of the sounding units 200 is directed towards the display panel 100.

Optionally, in this example, as shown in FIG. 5, a projection of the sounding unit 200 onto a plane where the display panel 100 is located, covers at least one opening 500. That is, the sounding unit 200 is arranged opposite to the at least one opening 500. Sound produced by the sounding units 200 is output through the opposite opening 500 in the display panel 100 as well as openings 500 located within a predetermined distance from the opposite opening 500.

In one embodiment, the sound produced by the sounding units 200 may be directly transmitted to the openings 500 in the display panel 100, so that the sound produced by the sounding units 200 can be output from the display panel 100 through the spacing regions between the adjacent pixel unit groups 110.

In another embodiment, a separate sound transmission structure such as a sound guide element, may be arranged between the sounding unit 200 and the opening 500 in the display panel 100 for transmitting sound produced by the sounding unit 200 to positions of the corresponding openings 500.

With the display device of the third example of the present application, by utilizing characteristics that an OLED display panel does not require a back light, distances between OLED pixel units are large and the OLED pixel units are mutually independent, the sound transmission channels may be formed by forming openings extending through upper and lower glass substrates of the display panel in the spacing regions between the adjacent OLED pixel units, and then the sound produced by the sounding units 200 can be output from the display panel.

Figure 7:
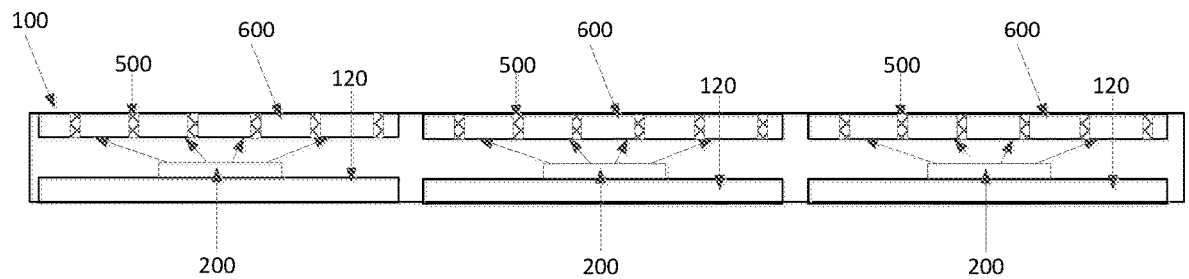
FIG. 7 is a schematic sectional view of a fourth example of a display device according to an embodiment of the present application.

In the fourth example of the present application, as shown in FIG. 7, on the basis that the sound transmission channels may be formed by forming openings extending through upper and lower glass substrates of the display panel in the spacing regions between the adjacent OLED pixel units, for realizing the screen sounding effect, in this example, as compared with the third example, the display device includes multiple display sub-panels 600 arranged in an array. Each display sub-panel 600 includes multiple display pixel groups. Specifically, positions of openings 500 in each display sub-panel 600 and an arrangement manner of corresponding sounding units 200 may refer to description of the third example in conjunction with FIG. 5 and FIG. 6, which will not be described.

Optionally, in the fourth example, as shown in FIG. 7, the display device includes multiple circuit boards 120 spaced apart from the display panel 100. Each circuit board 120 is corresponding to one display sub-panel 600. Each sounding unit 200 is fixed to one circuit board 120 and sound output of the sounding unit 200 is realized by the corresponding circuit board 120.

It should be noted that the number of sounding units 200 arranged on one corresponding display sub-panel 600 may be one or more, and may be specifically determined according to a distribution region and an area of the openings 500 in one display sub-panel 600.

With the display device of the embodiment of the present application, the sound output of the sounding units can be realized by utilizing the openings defined in the spacing regions between the light-emitting pixel units. Simulation results show that the foregoing manner can preserve frequency response curve characteristics of traditional loudspeaker sound source and ensure better sound output effect.

Figure 8:
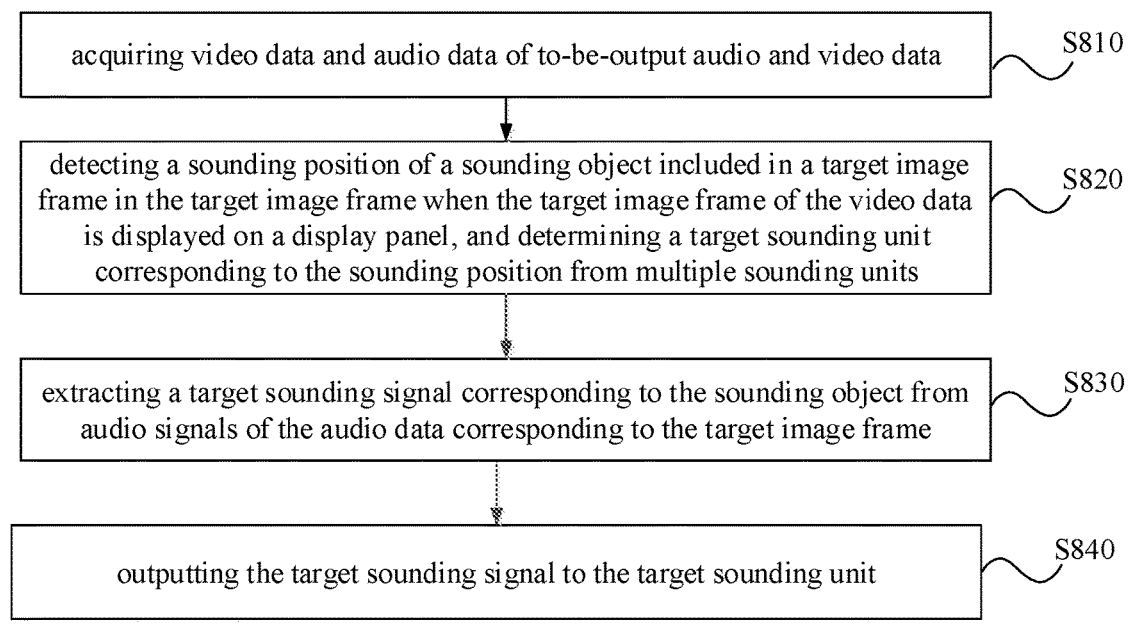
FIG. 8 is a schematic flow chart of a sounding control method according to an embodiment of the present application.

Another aspect of the embodiments of the present application further provides a sounding control method applied to the display device in any foregoing embodiment. As shown in FIG. 8, the method includes:

S810: acquiring video data and audio data of to-be-output audio and video data;

S820: detecting a sounding position of a sounding object included in a target image frame in the target image frame when the target image frame of the video data is displayed on a display panel, and determining a target sounding unit corresponding to the sounding position from multiple sounding units;

S830: extracting a target sounding signal corresponding to the sounding object from audio signals of the audio data corresponding to the target image frame; and S840: outputting the target sounding signal to the target sounding unit.

By adopting the sounding control method of the display device according to the embodiment, the corresponding sounding unit can output an audio signal corresponding to the sounding object according to the position of the sounding object on the display screen, thereby providing a screen sounding and sound-picture integrated playing effect.

Optionally, the sounding control method further includes:

determining a sounding channel for outputting the audio data corresponding to the target image frame;

outputting the audio data to multiple sounding units corresponding to the sounding channel; where the sounding units located in different regions are corresponding to different sounding channels.

With this embodiment, multiple sounding units on the display panel may be divided into multiple regions, and each region is corresponding to one sounding channel. Surround stereo effect can be realized by controlling different sounding channels to produce sound, thereby providing good listening experience.

Another embodiment of the present application further provides a sounding control device, applied to the display device in any one foregoing embodiment. The sounding control device includes:

a data acquisition module configured to acquire video data and audio data of to-be-output audio and video data;

a detection module configured to detect a sounding position of a sounding object included in a target image frame in the target image frame when the target image frame of the video data is displayed on a display panel, and determine a target sounding unit corresponding to the sounding position from multiple sounding units;

an extraction module configured to extract a target sounding signal corresponding to the sounding object from audio signals of the audio data corresponding to the target image frame; and a sound output module configured to output the target sounding signal to the target sounding unit.

Optionally, the sounding control device further includes: a sound channel determination module configured to determine a sounding channel for outputting the audio data corresponding to the target image frame.

The sound output module is further configured to output the audio data to multiple sounding units corresponding to the sounding channel; where the sounding units located in different regions are corresponding to different sounding channels.

By adopting the display device, the sounding control method and the sounding control device according to the embodiments of the present application, there is no need to vibrate the screen to produce sound, the sounding method that is easy to implement and convenient to control is adopted, thereby realizing the screen sounding effect while ensuring better sound quality without damage to the display panel.

Persons having ordinary skill in the art may obtain that, taking into account various embodiments of the present application, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present application.

In the embodiments of the present application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may not be physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present application, each functional unit may be integrated into one processing unit. Alternatively, each unit may exist physically alone. Still alternatively, two or more units may be integrated into one unit.

It can be understood that these embodiments described in the present application may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present application.

For software implementations, the technologies described in the present application can be implemented through the modules that perform the functions described in the present application (such as procedures, functions, and so on). Software codes can be stored in the storage and executed by the processor. The storage can be implemented in or outside of the processor.

The above are optional embodiments of the present application. It should be pointed out that, for persons having ordinary skill in the art, several improvements and changes may be made, without departing from the principle of the present application. These improvements and changes should also be within the scope of the present application.

What is claimed is:

1. A display device, comprising:
    a display panel including a plurality of display pixel groups, wherein each display pixel group includes at least one pixel unit;
    a plurality of sounding units arranged in an array at one side of the display panel away from a display screen; and
    sound transmission channels in spacing regions between adjacent ones of the display pixel groups;
    wherein sound produced by the sounding units is output from the display panel through the sound transmission channels, and sound produced by different ones of the sounding units is output through different ones of the sound transmission channels,
    wherein each display pixel group is a display sub-panel; the display panel is composed of a plurality of display sub-panels sequentially spliced; splicing gaps in spacing regions between adjacent ones of the display sub-panels are formed as the sound transmission channels; or,
    the pixel unit is a light-emitting pixel unit a region between the light-emitting pixel unit of one of the display pixel groups and the light-emitting pixel unit of another one of the display pixel groups is the spacing region; an opening that extends through opposite surfaces of the display panel, is defined in the spacing region; the opening is formed as the sound transmission channel.

2. The display device according to claim 1, wherein the display device further includes a controller; the sounding units are coupled with the controller, and the controller is configured to output different audio signals to different ones of the sounding units.

3. The display device according to claim 1, wherein a sounding direction of the sounding units is a direction toward the display screen; and the display device further includes: a sound guide element arranged between the display panel and the sounding unit; through the sound guide element, sound generated by the sounding unit is transmitted to the corresponding sound transmission channel.

4. The display device according to claim 1, wherein an orthographic projection of the sounding unit onto a plane where the display panel is located, covers the corresponding sound transmission channel.

5. The display device according to claim 4, wherein the display device further includes a support plate spaced apart from the display panel; and each of the sounding units is installed on the support plate.

6. The display device according to claim 5, wherein the support plate is a circuit board for display control.

7. The display device according to claim 1, wherein a sounding direction of the sounding units is a direction away from the display screen; and the display device further includes:
    a sound wave reflecting element disposed at one side of the sounding units away from the display panel, and configured to reflect sound produced by the sounding units in a direction toward the display screen; and
    sound guide elements disposed between the sound wave reflecting element and the display panel and configured to transmit the sound reflected by the sound wave reflecting element to the corresponding sound transmission channels.

8. The display device according to claim 7, wherein the display device further includes a circuit board corresponding to each of the display pixel groups; the circuit board is attached to the display panel; and the sounding units are arranged at one side of the circuit board away from the display panel.

9. The display device according to claim 8, wherein at least one of the sounding units is arranged on each circuit board.

10. The display device according to claim 1, wherein the pixel unit is a light-emitting pixel unit; an opening that extends through opposite surfaces of the display panel, is defined in the spacing region; a sounding direction of the sounding unit is directed to a plurality of openings; and the sound produced by the sounding units are output through the plurality of the openings.

11. The display device according to claim 10, wherein the display device further includes a circuit board spaced apart from the display panel; and the sounding units are between the circuit board and the display panel, and are fixed to the circuit board.

12. The display device according to claim 10, wherein the display device includes a plurality of display sub-panels arranged in an array, and each of the display sub-panels includes a plurality of display pixel groups.

13. The display device according to claim 1, wherein the sound transmission channels used for outputting the sound produced from the sounding units are uniformly distributed at the display panel.

14. The display device according to claim 1, wherein the display device further includes a sounding control device; and the sounding control device includes:
    a data acquisition module configured to acquire video data and audio data of to-be-output audio and video data;
    a detection module configured to detect a sounding position of a sounding object included in a target image frame in the target image frame when the target image frame of the video data is displayed on the display panel, and determine a target sounding unit corresponding to the sounding position from the sounding units;
    an extraction module configured to extract a target sounding signal corresponding to the sounding object from audio signals of the audio data corresponding to the target image frame; and
    a sound output module configured to output the target sounding signal to the target sounding unit.

15. The display device according to claim 14, wherein the sounding control device further includes: a sound channel determination module configured to determine a sounding channel for outputting the audio data corresponding to the target image frame;
    the sound output module is further configured to output the audio data to the sounding units corresponding to the sounding channel; wherein the sounding units located in different regions are corresponding to different sounding channels.

16. A sounding control method applied to the display device according to claim 1, the method comprising:
acquiring video data and audio data of to-be-output audio and video data;
detecting a sounding position of a sounding object included in a target image frame in the target image frame when the target image frame of the video data is displayed on the display panel, and determining a target sounding unit corresponding to the sounding position from the sounding units;
extracting a target sounding signal corresponding to the sounding object from audio signals of the audio data corresponding to the target image frame; and
outputting the target sounding signal to the target sounding unit.

17. The sounding control method according to claim 16, wherein the method further includes:
determining a sounding channel for outputting the audio data corresponding to the target image frame;
outputting the audio data to the sounding units corresponding to the sounding channel; wherein the sounding units located in different regions are corresponding to different sounding channels.

18. A sounding control device, applied to the display device according to claim 1, comprising:
a data acquisition module configured to acquire video data and audio data of to-be-output audio and video data;
a detection module configured to detect a sounding position of a sounding object included in a target image frame in the target image frame when the target image frame of the video data is displayed on a display panel, and determine a target sounding unit corresponding to the sounding position from sounding units;
an extraction module configured to extract a target sounding signal corresponding to the sounding object from audio signals of the audio data corresponding to the target image frame; and
a sound output module configured to output the target sounding signal to the target sounding unit.

19. The sounding control device according to claim 18, wherein the sounding control device further includes: a sound channel determination module configured to determine a sounding channel for outputting the audio data corresponding to the target image frame;
the sound output module is further configured to output the audio data to the sounding units corresponding to the sounding channel; wherein the sounding units located in different regions are corresponding to different sounding channels.

20. A display device, comprising:
a display panel including a plurality of display pixel groups, wherein each display pixel group includes at least one pixel unit;
a plurality of sounding units arranged in an array at one side of the display panel away from a display screen; and
sound transmission channels in spacing regions between adjacent ones of the display pixel groups;
wherein sound produced by the sounding units is output from the display panel through the sound transmission channels, and sound produced by different ones of the sounding units is output through different ones of the sound transmission channels,
wherein a sounding direction of the sounding units is a direction away from the display screen; and the display device further includes:
a sound wave reflecting element disposed at one side of the sounding units away from the display panel, and configured to reflect sound produced by the sounding units in a direction toward the display screen; and
sound guide elements disposed between the sound wave reflecting element and the display panel and configured to transmit the sound reflected by the sound wave reflecting element to the corresponding sound transmission channels.

* * * * *